United States Patent
Steigerwald et al.

(10) Patent No.: US 6,556,462 B1
(45) Date of Patent: Apr. 29, 2003

(54) HIGH POWER FACTOR CONVERTER WITH A BOOST CIRCUIT HAVING CONTINUOUS/DISCONTINUOUS MODES

(75) Inventors: Robert Louis Steigerwald, Burnt Hills, NY (US); Vinod John, Montpelier, VT (US); Milan Zarko Ilic, Fort Collins, CO (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/064,278

(22) Filed: Jun. 28, 2002

(51) Int. Cl.[7] .............................................. H02M 7/217
(52) U.S. Cl. ...................................................... 363/89
(58) Field of Search ........................... 363/84, 89, 125, 363/127

(56) References Cited

U.S. PATENT DOCUMENTS

| | | | | |
|---|---|---|---|---|
| 4,729,088 A | * | 3/1988 | Wong | .......................... 363/124 |
| 5,146,398 A | * | 9/1992 | Vila-Masot et al. | ........... 363/89 |

(List continued on next page.)

OTHER PUBLICATIONS

DeMari Yves, "Easy Power Factor Corrector Using a DSP", Milano, Italy, 8 pages, Nov. 19, 2001.
Chip Center Internet Article entitled "Motorola Semiconductor Components Group Introduces World's First Multiple Mode Power Factor Controller Circuit—Innovative "follower" mode operation offers up to 50% system cost cut" located at: http://www.chipcenter.com/power/powp204.html?PRINTxtrue, copyright 1999, 2 pages, Oct. 15, 1999.

(List continued on next page.)

*Primary Examiner*—Jeffrey Sterrett
(74) *Attorney, Agent, or Firm*—Ann M. Agosti; Patrick K. Patnode (57) ABSTRACT

A high power factor converter system comprises an input rectifier, a converter and a booster circuit. The input rectifier is configured for rectifying an input ac voltage. The converter is configured for generating an output voltage for the high power factor converter system. The converter comprises several converter switches and inverse parallel diodes. The booster circuit comprises an inductor and at least one converter switch and an inverse parallel diode of the converter. The inductor is coupled between the input rectifier and the converter. The booster circuit is configured for controlling the supply of a booster current through the inductor to be discontinuous when the instantaneous voltage level is less than a predetermined fraction of a dc voltage level across the converter and continuous when the instantaneous voltage level is greater than the predetermined fraction of the dc voltage level.

42 Claims, 5 Drawing Sheets

U.S. PATENT DOCUMENTS

| | | | | |
|---|---|---|---|---|
| 5,408,403 | A | * | 4/1995 | Nerone et al. ............... 363/89 |
| 5,471,378 | A | | 11/1995 | King ........................... 363/46 |
| 5,576,940 | A | * | 11/1996 | Steigerwald et al. .......... 363/89 |
| 5,712,536 | A | * | 1/1998 | Haas et al. ................. 363/132 |
| 6,031,739 | A | * | 2/2000 | He et al. ...................... 363/89 |
| 6,388,429 | B1 | * | 5/2002 | Mao ............................ 363/89 |
| 6,469,917 | B1 | * | 10/2002 | Ben-Yaakov ................. 363/89 |

OTHER PUBLICATIONS

S. Streng, et al, "Ripple Feedback for the Resonant–Filter Unity–Power–Factor Rectifier", 1992 IEEE Trans. on Power Electronics, vol. 7, No. 3, Jul. 1992, pp. 453–461.

H. Pinheiro, et al., "Self–Oscillating Resonant AC/DC Converter Topology for Input Power–Factor Correction", IEEE Trans on Industrial Electronics, vol. 46, No. 4, Aug. 1999, pp. 692–702.

Yen–Wo Lo, et al "High Performance Ripple Feedback for the Buck Unity–Power–Factor Rectifier", IEEE Trans.on Power Electronics, vol. 10, No. 21, Mar. 1995, pp. 158–163.

Yen–Wu Lo, et al "High–Performance Ripple Feedback for the Buck Unity–Power–Factor Rectifier", Mar. 1993 IEEE, pp. 948–953.

Roger J. King, "Analysis and Design of an Unusual Unity-Power–Factor Rectifier", IEEE Trans.on Industrial Electronics, Vo. 38, No. 2, Apr. 1991, pp. 126–134.

K. Hirachi, et al "Improved Control Strategy on Buck–Type PFC Converter", Electronics Letters, Jun. 1998, vol. 34, No. 12, pp. 1162–1163.

K. Hirachi, et al "Improved Control Strategy on Buck–Type Converter With Power Factor Correction Scheme", IEEE, pp. 826–832, Dec. 1996.

Richard Morrison, et al "A New Single Transformer, Power Factor Corrected UPS Design", Mar. 1998 IEEE, pp. 293–299.

* cited by examiner

HIGH POWER FACTOR CONVERTER WITH A BOOST CIRCUIT HAVING CONTINUOUS/DISCONTINUOUS MODES

BACKGROUND OF INVENTION

The present invention relates generally to a high power factor converter system, and more specifically to a method and apparatus for generating an output with high power factor input.

Many devices such as X-ray machines, ultrasound power supplies, and electronically commuted motors (ECMs) operate on power drawn from external alternating current power transmission lines. Converter systems are usually designed to draw power from the power transmission lines and to provide the power to such devices. Usually such converter systems are not purely resistive or linear. Therefore, the current and the voltage components of power lag or lead each other, and may substantially deviate from desired sinusoidal waves.

Power factor is a function of the root mean square value of current and voltage components of power. Mathematically, power factor is defined as the cosine of the phase angle between the voltage component and current component of power. Nonlinear loads such as rectifier circuits draw non-sinusoidal current from the converter system as well. Since such currents generally do not produce any useful power, they also contribute to the lowering of power factor. It is often desirable to maintain a high power factor so as to draw maximum power per current unit from the alternating current power transmission line. A low power factor results in undesirable transmission losses and low system performance.

Conventional converter circuits designed to assist in maintaining a high power factor typically include input and output stages. The input stage and the output stage of a converter circuit are usually connected using high power switches. High power switches are typically expensive and therefore add to the cost of the converter circuit.

In addition, converter circuits generally include relatively large electrolytic capacitors which are required to be charged periodically. The charging circuits of such converter circuits are usually charged using additional charging devices such as contactors, charging resistors, or combinations thereof. Such additional charging devices also add to the cost of converter circuits.

Therefore, what is desired is a method and apparatus for generating output power that results in a high power factor while minimizing the cost of implementation.

SUMMARY OF INVENTION

Briefly, in one embodiment of the invention, a high power factor converter comprises an input rectifier, a converter and a booster circuit. The input rectifier is configured for rectifying an input ac voltage. The converter is configured for generating an output voltage for the high power factor converter system, and comprises converter switches and inverse parallel diodes. The booster circuit comprises an inductor and at least one converter switch and at least one inverse parallel diode of the converter. The inductor is coupled between the input rectifier and the converter. The booster circuit is configured for controlling the supply of a booster current through the inductor to be discontinuous when an instantaneous voltage level of the input ac voltage is less than a reference voltage level and continuous when the instantaneous voltage level is greater than the reference voltage level.

Another aspect of the invention is a method for generating an output voltage with a high power factor input. The method comprises rectifying an input ac voltage, and using the rectified input ac voltage to obtain a booster current. The supply of a booster current is controlled to be discontinuous when an instantaneous voltage level of the input ac voltage is less than a reference voltage level and continuous when the instantaneous voltage level is greater than the reference voltage level. The controlled supply of the booster current is used for generating the output voltage.

Another embodiment of the invention provides a high voltage generator for driving an X-ray tube comprising an input rectifier, a converter and a booster circuit. The input rectifier is configured for rectifying an input ac voltage. The converter is configured for supplying an output voltage for the X-ray tube and comprises converter switches and inverse parallel diodes. The booster circuit comprises an inductor and at least one converter switch and at least one inverse parallel diode of the converter. The inductor is coupled between the input rectifier and the converter. The booster circuit is configured for controlling the supply of a booster current through the inductor, the current being discontinuous when an instantaneous voltage level of the input ac voltage is less than a reference voltage level and continuous when the instantaneous voltage level is greater than the reference voltage level.

Another embodiment of the invention provides a system generating an output voltage comprising means for rectifying an input ac voltage and means for using the rectified input ac voltage to obtain a booster current. The system comprises means for controlling the supply of the booster current to be discontinuous when an instantaneous voltage level of the input ac voltage is less than a reference voltage level and continuous when the instantaneous voltage level is greater than the reference voltage level. The system comprises means for generating the output voltage while maintaining high power factor input by using the controlled supply of the booster current.

BRIEF DESCRIPTION OF DRAWINGS

These and other features, aspects, and advantages of the invention will become better understood when the following detailed description is read with reference to the accompanying drawings in which like characters represent like parts throughout the drawings, wherein.

DETAILED DESCRIPTION

Figure 1:
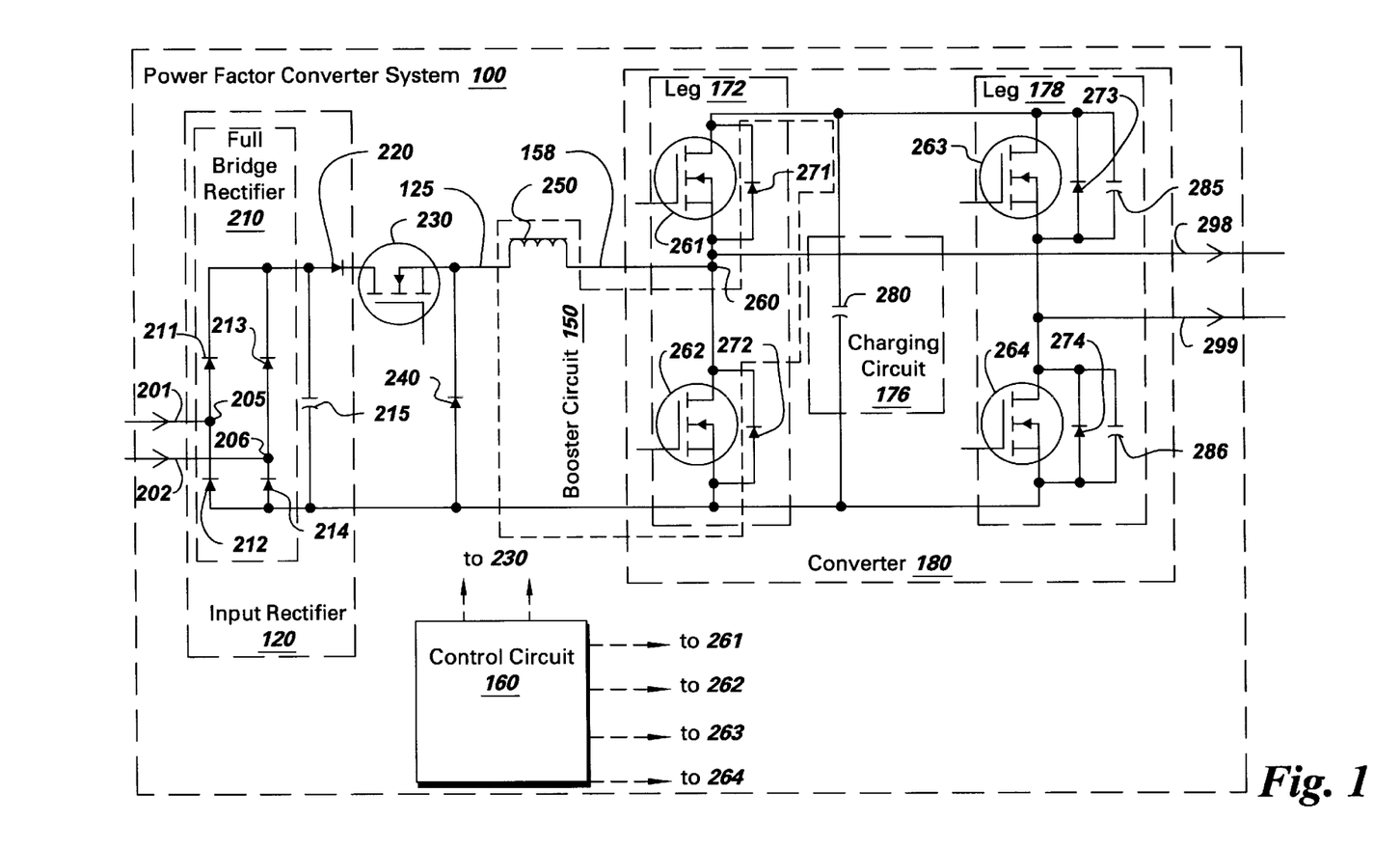
FIG. 1 is a circuit diagram illustrating a high power factor converter system in accordance with one embodiment of the present invention.

FIG. 1 is circuit diagram illustrating a high power factor converter system in accordance with one embodiment of the present invention. The functional components of high power factor converter system 100 are shown as input rectifier 120, booster circuit 150, control circuit 160 and converter 180. High power factor converter system 100 is particularly useful for supplying power to various devices such as X-ray machines and ultra sound power supplies, for example while maintaining a high power factor at the input. Each component is described in further detail below.

Input rectifier 120 rectifies an input ac voltage to generate a corresponding rectified voltage. In one embodiment the input ac current is obtained from a single phase ac transmission line of relatively low current rating (typically about 15–20 amperes). The rectified voltage is provided to booster circuit 150. Booster circuit 150 generates a booster current according to the instantaneous voltage level of the input ac voltage. Control circuit 160 is typically used to control the various switches that are present in booster circuit 150 and converter 180. Control circuit 160 may comprise digital components, analog components, or a combination of digital and analog components.

In one embodiment of the invention, converter 180 comprises first leg 172, a charge storage circuit 176 and second leg 178. Examples of charge storage circuit 176 include capacitors and batteries. First leg 172 causes the booster current to charge the charge storage circuit. Second leg 178 along with the first leg operates to draw current from the charge stored in charge storage circuit 178 and booster circuit 150 to generate a corresponding output voltage on lines 298 and 299.

FIG. 1 additionally illustrates an example implementation of a more specific embodiment of high power factor converter system 100 wherein the high power factor converter system includes a full bridge rectifier 210, rectifier diode 220, shunt capacitor 215, buck switch 230, buck diode 240, inductor 250, control circuit 160, first converter switch 261, second converter switch 262, third converter switch 263, and fourth converter switch 264, first inverse parallel diode 271, second inverse parallel diode 272, third inverse parallel diode 273, and fourth inverse parallel diode 274, charge capacitor 280, first converter capacitor 285 and second converter capacitor 286.

In the illustrated embodiment, the input rectifier comprises full bridge rectifier 210, rectifier diode 220 and shunt capacitor 215. Full bridge rectifier 210 is shown as comprising bridge diodes 211, 212, 213, and 214. Bridge diode 211 is connected to bridge diode 212 at junction 205. Similarly, bridge diode 213 is connected to bridge diode 214 at junction 206. The ac transmission power lines are connected to junctions 205 and 206 respectively. Shunt capacitor 215 is coupled in parallel across the output side of the full bridge rectifier. Rectifier diode 220 is coupled in series between the output side of the shunt capacitor and the input side of the booster circuit. Rectifier diode 220 is thus configured for preventing the charge present on charge storage circuit 150 from discharging through shunt capacitor 215.

Converter 180 comprises first leg 172, charge storage circuit 176 and second leg 178. Charge storage circuit 176 is coupled in parallel across first leg 172 and a dc voltage is measured across the charge storage circuit. In FIG. 1, the charge storage circuit is represented by charge capacitor 280.

The first leg comprises first converter switch 261 and second converter switch 262. The first converter switch is coupled across first inverse parallel diode 271, and the second converter switch is coupled across a second inverse parallel diode 272. The first converter switch and the second converter switch are coupled to each other at first junction 260.

Similarly, second leg 178 comprises third converter switch 263 coupled across third inverse parallel diode 273 and fourth converter switch 264 coupled across fourth inverse parallel diode 274. In addition, third converter switch 263 is coupled across first converter capacitor 285 and fourth converter switch 264 is coupled across second converter capacitor 286. The third converter switch and the fourth converter switch are coupled to each other at second junction 270.

In the illustrated embodiment, booster circuit 150 comprises an inductor 250, second converter switch 262 and first inverse parallel diode 271. Inductor 250 is connected to input rectifier 120 via buck switch 230. Buck diode 240 is coupled in parallel across shunt capacitor 215. In one embodiment, control circuit 160 is used to control buck switch 230, and converter switches 261, 262, 263 and 264.

The manner in which the above components of high power factor converter system 100 operate to generate an output voltage while maintaining a high power factor at the input ac line is described in further detail below.

When high power factor converter system 100 is first placed in operation, that is, turned ON, the charge on charge capacitor 280 equals zero. Charge capacitor 280 is charged to a desired value by controlling the gate drive signals for buck switch 230 and second converter switch 262 of high power factor controller system 100. Buck switch 230 is used for limiting the current into capacitor 280 when the voltage of capacitor 280 is lower than the instantaneous voltage of the input ac voltage.

Full bridge rectifier 210 operates to rectify the input ac voltage including both positive and negative components and generate a corresponding rectified voltage including only positive components. The rectified voltage is propagated via rectifier diode 220 and buck switch 230 to inductor 250 on power line 125. Shunt capacitor 215 provides a path for high-frequency ripple currents generated when buck switch 230 is switched OFF and ON, to control the current in inductor 250.

Inductor 250 receives the rectified voltage and generates a corresponding booster current in line 158. The booster current is either discontinuous or continuous depending upon the instantaneous voltage level and a reference voltage level. In the illustrated embodiment, the reference voltage level is a fraction of the dc voltage level across the charge capacitor. If the instantaneous voltage level is less than the fraction of the dc voltage level across the charge storage circuit, the booster current is discontinuous. On the other hand, if the instantaneous voltage level is more than the fraction of the dc voltage level across the charge storage circuit, the booster current is continuous.

As used herein, "continuous" means that the booster current has only non-zero values. "Discontinuous" means that current has various values that include zero values. The fraction is proportional to the duty cycle of the first leg. Duty cycle is defined as the ratio of the time period of a switch when the switch is turned ON, to the total time period of the switch. In one example, duty cycle is determined using the following equation:

$$\text{Duty Cycle} = T\text{on}/(T\text{on} + T\text{off}) \qquad \text{Equation (1)}$$

where Ton represents time when switch is ON, and Toff represents time when switch is OFF.

For example, if a switch is ON for 0.5 seconds and is OFF for 0.5 seconds, the duty cycle of the switch equals 0.5/(0.5+0.5), or 50%.

The relationship between the pre-determined fraction and the duty cycle is shown by the following equation:

$$V(\text{dc})/V(\text{in}) < 1/(1-D) \qquad \text{Equation (2)}$$

where V(dc) represents a voltage level across charge storage circuit, V(in) represents an instantaneous voltage level of the input ac voltage, and D represents the duty cycle.

Re-arranging equation (2), the following equation is obtained:

$$V(in) < (1-D)V(dc) \quad \text{Equation (3)}$$

From equation (3), the value of (1–D) equals the fraction of dc voltage level across the capacitor. Thus, if switch 262 of first leg 172 is operated on 80% duty cycle, the fraction equals 0.2. Thus, when the instantaneous voltage level is more than 0.2 times V(dc), the booster current is continuous.

Thus, the buck switch is configured for switching to a conducting state, i.e., the buck switch is ON, synchronously with the second converter switch, 262, and a non conducting state, i.e. the buck switch is OFF, when the booster current exceeds a pre-determined value. In an embodiment, the pre-determined value equals a reference current that is proportional to the input ac voltage. Control circuit 160 operates to compare the booster current with the reference current. When the booster current exceeds the reference current, the buck switch is turned OFF.

Converter switches 261 and 262 operate in a complementary fashion. When 262 is on, 261 is off and visa versa. Control circuit 160 supplies the gate drive signals for the switches and assures that there is never simultaneous conduction.

When buck switch 230 turns OFF, the booster current circulates through converter switch 262 and buck diode 240 until converter switch 262 turns OFF. At this point, booster current is forced to circulate through inverse parallel diode 271 which would in turn result in the charging of charge capacitor 280. When 262 turns off, 261 also turns on after a short time to ensure that there is no simultaneous conduction with 262. Thus, diode 271 and switch 261 are each carrying a fraction of the total current in inductor 250 during this interval.

Converter switches 263 and 264, inverse parallel diodes 273 and 274, and capacitors 265 and 286 in conjunction with switches 261, 262, inverse parallel diodes 271 and 272 together operate as a full bridge converter to draw output power from the charge stored in charge capacitor 280. Specifically, when converter switch 261 and 264 are place in a conducting state, i.e., switched ON, the output voltage generated is positive, and when converter switches 262 and 263 are switched ON, the output voltage generated is negative. Thus, the converter switches of the first leg and second leg switch alternatively to generate the output voltage on lines 298 and 299.

In one embodiment, the first converter switch, the second converter switch, the third converter switch and the fourth converter switch comprise power field effect transistors.

The distortion and phase angle of the input current are greatly reduced by the invention. As is well known in the relevant arts, power factor is proportional to the cosine of phase angle and inversely proportional to the root mean square of the distortion current. Thus, the power factor of the power delivered by the high power factor converter system is effectively high (typically greater than about 85% and, in some embodiments, greater than about 97%).

Figure 2:
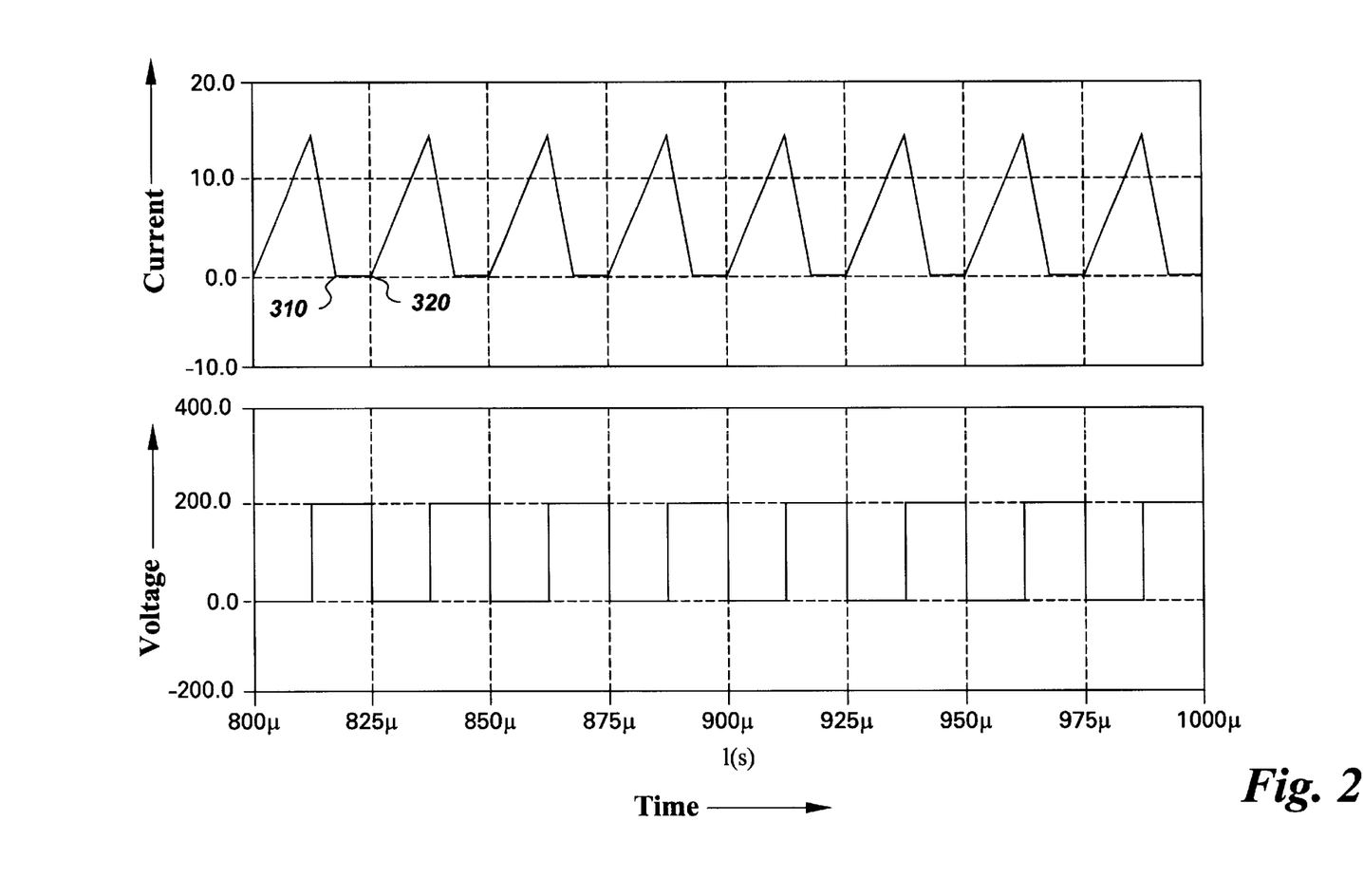
FIG. 2 is a graphical view of a booster current under conditions with a buck switch in a conducting state or the ON position and an instantaneous voltage level of an input ac voltage being less than half a voltage level across a charge capacitor.
Figure 3:
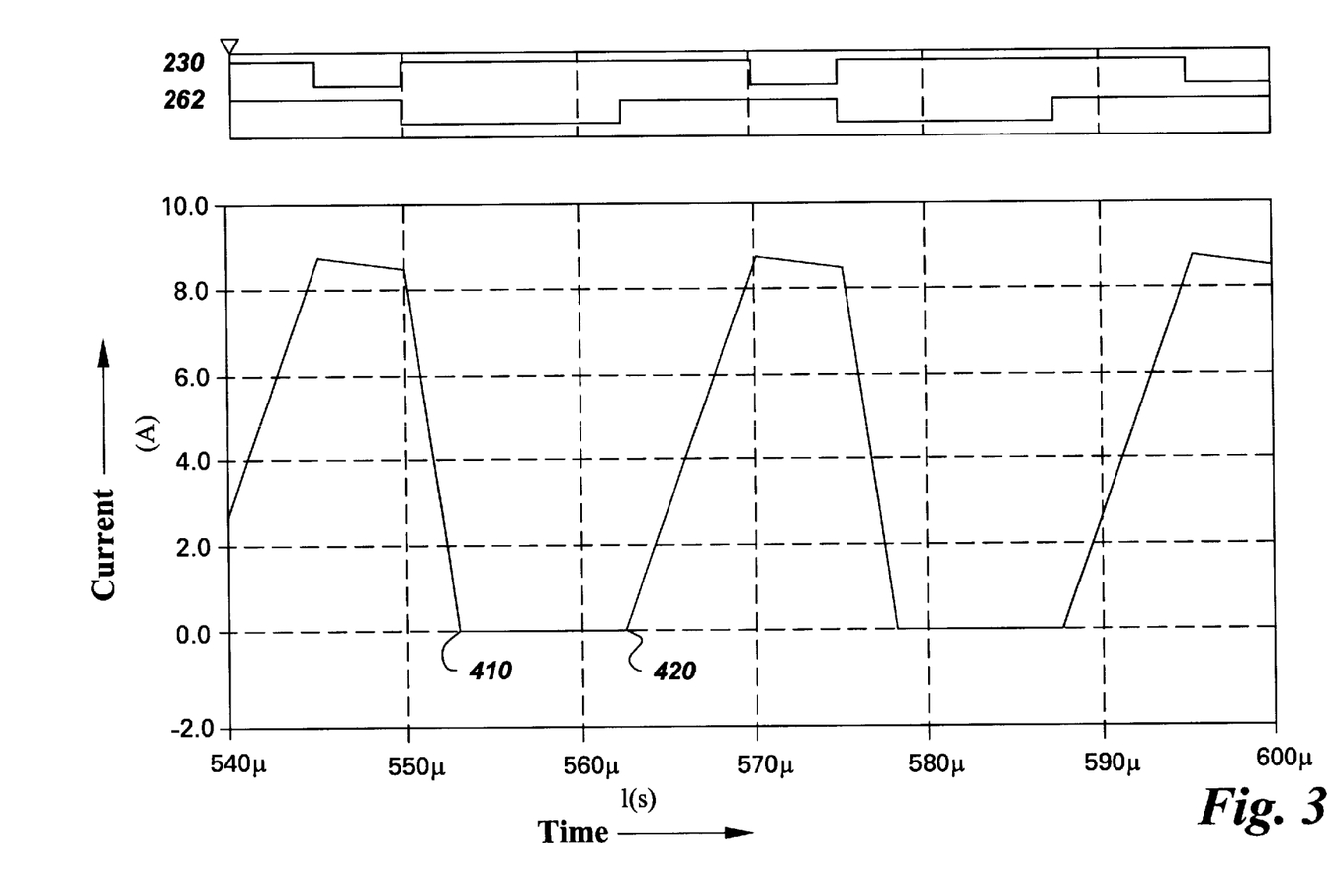
FIG. 3 is a graphical view of a booster current from the circuit of FIG. 2, when a buck switch is operated at 0.8 duty cycle and an instantaneous voltage level of an input ac voltage is less than half a voltage level across a charge capacitor.

The waveforms representing the booster current corresponding to different operating states of the foregoing circuitry are illustrated in FIG. 2, FIG. 3 and FIG. below. For the examples below, it is assumed that leg 172 is operated at 50% duty cycle. The buck switch is operated at 100% duty cycle in FIG. 2, and 80% duty cycle in FIG. 3 and FIG. 4. The booster current is discontinuous when the instantaneous voltage level is less than half the dc voltage level across the charge capacitor, and continuous otherwise.

FIG. 2 is a graphical view illustrating the booster current when an instantaneous voltage level of the input ac voltage is less than half the voltage level across charge capacitor 280 and buck switch 230 is operated at 100% duty cycle. Buck switch 230 is operated on 100% duty cycle, when the charge storage circuit has to be charged to a desired level. FIG. 2 also illustrates the voltage level at mid-point of leg 172. In FIG. 2, that booster current is discontinuous, that is, the booster current has a value equal to zero between various time points (for example, between time points 310 and 320).

FIG. 3 is a graphical view illustrating the booster current when an instantaneous voltage level of the input ac voltage is less than half the voltage level across charge capacitor and buck switch 230 is operated at 80% duty cycle. FIG. 3 also illustrates the gate drive signals for buck switch 230 and converter switch 262. The booster current is shown having a value equal to zero (between points 410 and 420), when converter switch 262 turns off, and a non-zero value when converter switch 262 turns ON (between points 420 and 430).

Figure 4:
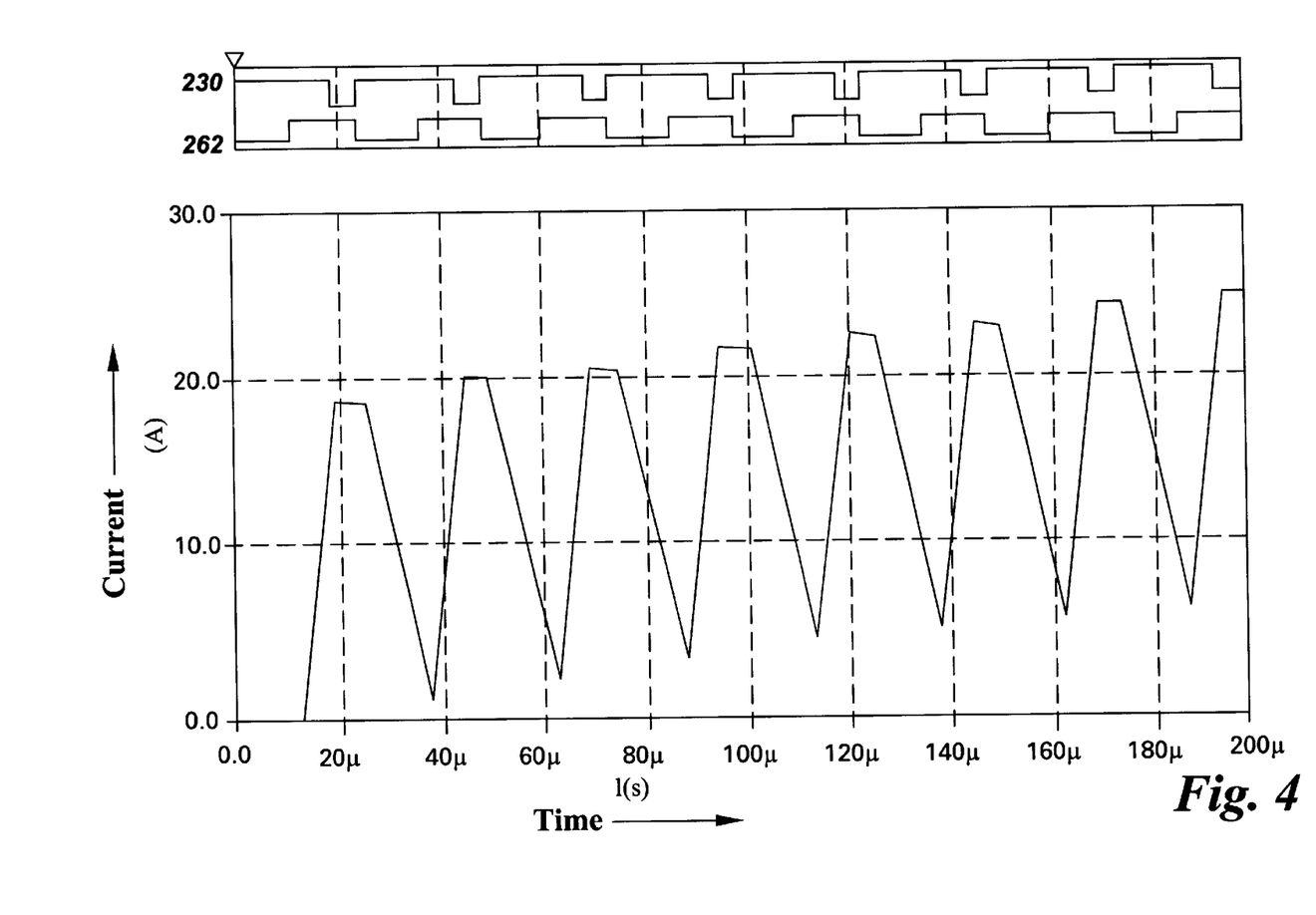
FIG. 4 is graphical view of a booster current from the circuit of FIG. 2, when a buck switch is repeated at 0.8 duty cycle and an instantaneous voltage level of an input ac voltage is more than half a voltage level across a charge capacitor.

FIG. 4 is a graphical view illustrating the booster current when an instantaneous voltage level of the input ac voltage is more than half the voltage level across the charge capacitor and buck switch 230 is operated at 80% duty cycle. In FIG. 4, the booster current is continuous.

The output voltage is drawn from charge capacitor 280 to supply the load. With proper control of the buck switch 230, power factor at the input is raised. The sharing of converter switch 262 and the inverse parallel diode 271 by the booster circuit and the converter makes the high power factor converter system less expensive while supplying power to a load.

Figure 5:
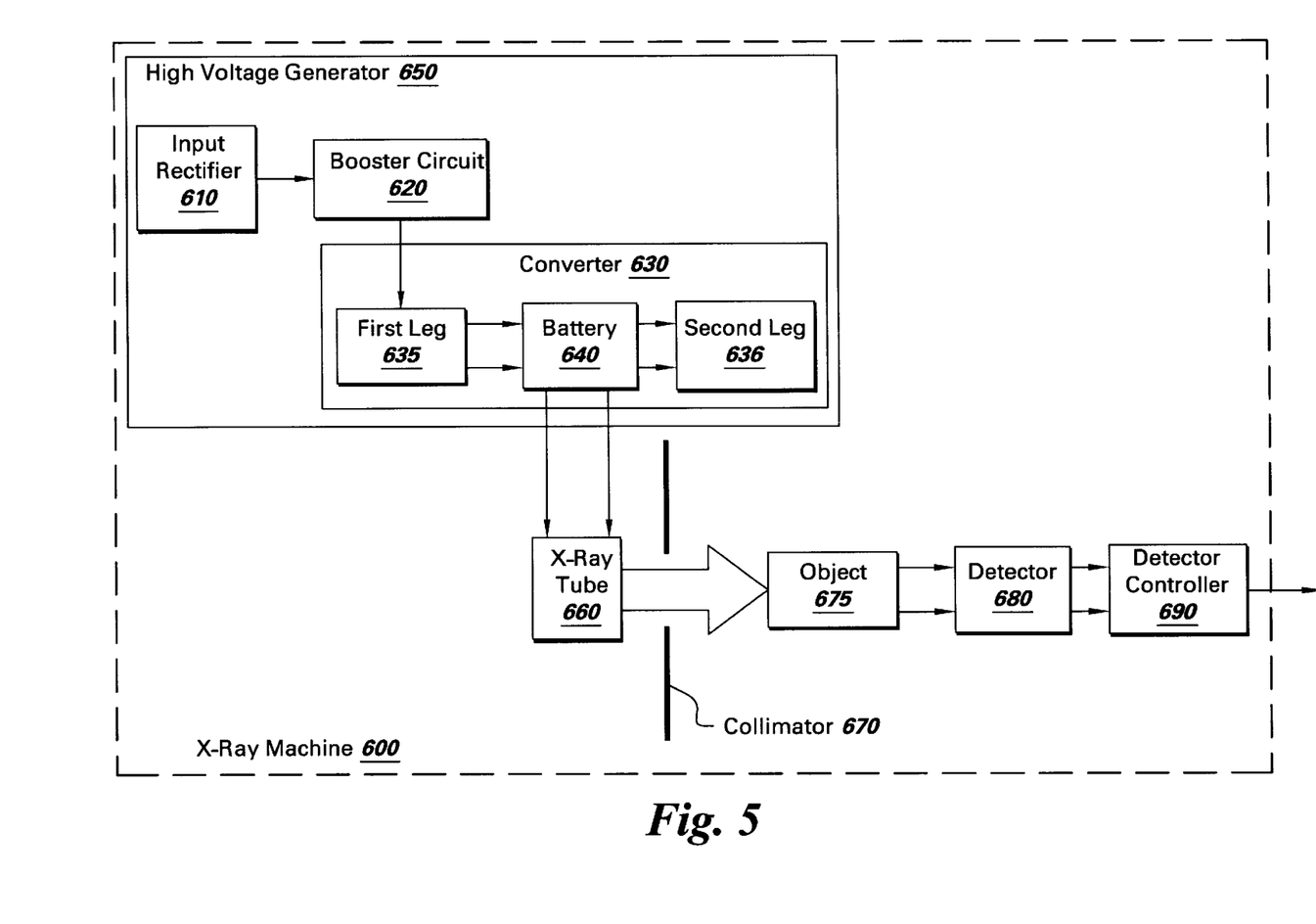
FIG. 5 is a block diagram illustrating certain functional components of an embodiment of an X-ray machine.

In another embodiment, a high voltage generator is used for driving an X-ray tube in an X-ray machine. FIG. 5 is a block diagram illustrating certain functional components of X-ray machine 600. X-ray machine 600 is shown comprising high voltage generator 650, X-ray tube 660, collimator 670, object 675, detector 680 and detector controller 690. Each component is described in further detail below.

The high voltage generator comprises an input rectifier 610, a booster circuit 620 and a converter 630. The input rectifier is configured for rectifying a single phase low power input ac voltage to a corresponding rectified voltage. The booster circuit 620 is coupled to the input rectifier, and is configured for generating a discontinuous booster current when the instantaneous voltage level of the input ac voltage is less than a reference voltage level and a continuous booster current otherwise. In more specific embodiment, the booster current is continuous also when the instantaneous voltage level is equal to the reference voltage level. The converter is coupled to the booster circuit for supplying an output voltage to X-ray tube 660.

In an embodiment, converter comprises 630 a first leg 635, and battery 645, the battery being coupled in parallel across the first leg. The input rectifier, the booster circuit, the first leg and second leg of the high voltage generator can be implemented as described with reference to the high power factor converter system 100. In the case of the high voltage generator, the battery is typically used as the charge storage circuit.

The first leg and the second leg of the converter are configured for generating the output voltage by drawing the output voltage from the battery. The output voltage occurs in short bursts (typically every few seconds). When the first and second legs are not supplying the high-power bursts, the first leg can be operated at any duty cycle and therefore can be controlled as a high power factor converter to charge the battery. At this time, the second leg may be turned off so that no power is delivered to the X-ray machine. When it is desired to deliver power to the X-ray tube, the second leg operates in the normal manner with the power bursts being delivered from the battery.

The power bursts from the battery are provided to X-ray tube 660, which in turn emits x-rays. Collimator 670 streams the x-rays to pass on to object 675. A portion of the x-rays passes through or around object 675 and impacts detector 680. Detector 680 converts the x-rays received to electric signals. Detector controller acquires and processes the electric signals to reconstruct an image of the features of the object.

In an embodiment, the input ac voltage can be removed from the high voltage generator 650 by using a relay (not shown) or, if the buck switch (not shown) is used, the buck switch can just be turned OFF. For such applications, the charging power is much lower than the burst power so that the relay or buck switch is inexpensive and of a power rating much lower than the power of the output voltage, thus making the high power factor converter system cost effective.

In another embodiment, a charge storage capacitor is used instead of a battery. In this case the capacitor can be charged at relatively low power by controlling the first leg. To deliver short, high power x-ray pulse, the second leg works in conjunction with the first leg while a relay or buck switch removes the input ac line to the system. In this manner, a low power utility outlet that is universally available can charge the capacitor, and a short, high power x-ray pulse that is well beyond the capability of the utility can be delivered from the capacitor.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A high power factor converter system, said high power factor converter system comprising:
   (i) an input rectifier configured for rectifying an input ac voltage;
   (ii) a converter configured for generating an output voltage for said high power factor converter system, said converter comprising converter switches and inverse parallel diodes;
   (iii) a booster circuit comprising (a) an inductor coupled between said input rectifier and said converter and (b) at least one converter switch and at least one inverse parallel diode of the converter, said booster circuit configured for controlling the supply of a booster current through said inductor to be discontinuous when an instantaneous voltage level of the input ac voltage is less than a reference voltage level and continuous when the instantaneous voltage level is greater than the reference voltage level.

2. The high power factor converter system of claim 1, wherein said input rectifier comprises a full bridge rectifier configured for receiving said input ac voltage, a rectifier diode and a shunt capacitor, said shunt capacitor being coupled in parallel across the output side of said full bridge rectifier and said rectifier diode coupled in series between the output side of said shunt capacitor and the input side of said booster circuit.

3. The high power factor converter system of claim 1, wherein said converter comprises a first leg, and a charge storage circuit, said charge storage circuit being coupled in parallel across said first leg; said reference voltage equal to a fraction of a dc voltage level measured across said charge storage circuit.

4. The high power factor converter system of claim 3, wherein said rectifier diode is configured for preventing said charge storage circuit from discharging through said shunt capacitor.

5. The high power factor converter system of claim 3, wherein said first leg comprises:
   (i) a first converter switch coupled across a first inverse parallel diode, and
   (ii) a second converter switch coupled across a second inverse parallel diode, said first converter switch and said second converter switch being coupled to each other at a first junction, wherein said first converter switch and said second converter switch are configured for obtaining high power factor and controlling said output voltage generated by said converter.

6. The high power factor converter system of claim 5, wherein said booster circuit comprises said second converter switch and said first inverse parallel diode.

7. The high power factor converter system of claim 5, wherein said converter further comprises a second leg, said second leg being coupled in parallel across said charge storage circuit.

8. The high power factor converter system of claim 7, wherein said second leg comprises a third converter switch coupled across a third inverse parallel diode and a fourth converter switch coupled across a fourth inverse parallel diode, said third converter switch and said fourth converter switch being coupled to each other at a second junction.

9. The high power factor converter system of claim 8, wherein said inductor is coupled to said first junction.

10. The high power factor converter system of claim 9, wherein said booster circuit is configured for, (i) applying the booster current to the second converter switch when the instantaneous voltage level is greater than said reference voltage level, until said second converter switch is in a non conducting state, and then (ii) applying said booster current to the first converter switch and said first inverse parallel diode, thereby charging said charge storage circuit.

11. The high power factor converter system of claim 10, wherein said reference voltage level is determined based upon the duty cycle at which said first leg is operated.

12. The high power factor converter system of claim 9, wherein said converter is configured for said first leg and said second leg generating said output voltage after drawing said output voltage in a sinusoidal manner from said charge storage circuit.

13. The high power factor converter system of claim 12, wherein said charge storage circuit comprises a charge capacitor.

14. The high power factor converter system of claim 12, wherein said charge storage circuit comprises a battery.

15. The high power factor converter system of claim 13, further comprising a buck switch coupled to said booster circuit and said input rectifier, said buck switch configured to be in a conducting state when power is applied to said high power factor system.

16. The high power factor converter system of claim 15, wherein said buck switch is configured to be in a non-conducting state when said booster current exceeds a predetermined value.

17. The high power factor converter system of claim 15, wherein said buck switch is configured for switching to a conducting state synchronously with said second converter switch.

18. The high power factor converter system of claim 17, further comprising a buck diode coupled in parallel across said buck switch and said input rectifier, wherein said second converter switch and said buck diode are configured for said booster current circulating therethrough when said second converter switch is placed in a conducting state.

19. The high power factor converter system of claim 17, wherein said first converter switch, said second converter switch, said third converter switch, said fourth converter switch and said buck switch comprise field effect transistors.

20. A high voltage generator for driving an X-ray tube comprising:
(i) an input rectifier configured for rectifying a single phase low power input ac voltage; (ii) a converter for supplying an output voltage for said X-ray tube, said converter comprising converter switches and inverse parallel diodes;
(iii) a booster circuit comprising (a) an inductor coupled between said input rectifier and said converter and (b) at least one converter switch and at least one inverse parallel diode of the converter, said booster circuit configured for controlling the supply of a booster current through said inductor to be discontinuous when instantaneous voltage level of the input ac voltage is less than a reference voltage level and continuous when the instantaneous voltage level is greater than the reference voltage level.

21. The high voltage generator of claim 20, wherein said input rectifier comprises a full bridge rectifier configured for receiving said input ac voltage, a rectifier diode and a shunt capacitor, said shunt capacitor being coupled in parallel across the output side of said full bridge rectifier and said rectifier diode coupled in series between the output side of said shunt capacitor and the input side of said booster circuit.

22. The high voltage generator of claim 20, wherein said converter comprises a first leg, and battery, said battery being coupled in parallel across said first leg; said reference voltage being equal to a fraction of a dc voltage of said battery.

23. The high voltage generator of claim 21, wherein said rectifier diode is configured for preventing said battery from discharging through said shunt capacitor.

24. The high voltage generator of claim 22, wherein said first leg comprises:
(i) a first converter switch coupled across a first inverse parallel diode,
(ii) a second converter switch coupled across a second inverse parallel diode, said first converter switch and said second converter switch being coupled to each other at a first junction, wherein said first converter switch and said second converter switch are configured for obtaining high power factor and controlling said output voltage generated by said converter.

25. The high voltage generator of claim 22, wherein said converter further comprises a second leg, said second leg being coupled in parallel across said battery.

26. The high voltage generator of claim 25, wherein said second leg comprises a third converter switch coupled across a third inverse parallel diode and a fourth converter switch coupled across a fourth inverse parallel diode, said third converter switch and said fourth converter switch being coupled to each other at a second junction.

27. The high voltage generator of claim 26, wherein said inductor is coupled to said first junction.

28. The high voltage generator of claim 27, wherein said booster circuit is configured for, (i) applying the booster current through the second converter switch when the instantaneous voltage level is greater than the reference voltage level and until said second converter switch is placed in a non-conducting state, and then (ii) applying said booster current through said first converter switch and said first inverse parallel diode.

29. The high voltage generator of claim 28, wherein said converter is configured for said first leg and said second leg generating said output voltage after drawing said output voltage in short bursts from said battery.

30. The high voltage generator of claim 29, wherein said first converter switch, said second converter switch, said third converter switch and said fourth converter switch comprise power field effect transistors.

31. A method for generating an output voltage with high power factor comprising:
(i) rectifying an input ac voltage;
(ii) using said rectified input ac voltage to obtain a booster current;
(iii) controlling the supply of said booster current to be discontinuous when an instantaneous voltage level of the input ac voltage is less than a reference voltage level and continuous when the instantaneous voltage level is greater than the reference voltage level; and
(iv) generating an output voltage by using the controlled supply of said booster current.

32. The method of claim 31, wherein (i) comprises rectifying the input ac voltage via a rectifier and (ii) comprises generating the output voltage via a converter, and further comprising preventing current from moving from said converter to said rectifier.

33. The method of claim 32, wherein (iii) comprises using a booster circuit comprising an inductor, a converter switch and an inverse parallel diode.

34. The method of claim 33, further comprising charging a charge storage circuit of the converter via said booster current.

35. The method of claim 34, further comprising drawing said output voltage from said charge storage circuit.

36. The method of claim 35, further comprising switching between applying a rectified voltage to the booster circuit synchronously with placing a second converter switch of said converter in a conducting state, and not applying said rectified voltage to said booster circuit when said booster current exceeds a predetermined value.

37. A system for generating an output voltage comprising:
(i) means for rectifying an input ac voltage;
(ii) means for using said rectified input ac voltage to obtain a booster current;
(iii) means for controlling the supply of said booster current to be discontinuous when an instantaneous voltage level of the input ac voltage is less than a reference voltage level and continuous when the instantaneous voltage level is greater than the said reference voltage level; and
(iv) means for generating said output voltage while maintaining high power factor input by using the controlled supply of said booster current.

38. The system of claim 37, wherein said means for rectifying comprises an input rectifier and said means for generating the output voltage comprises a converter, and further comprising means for preventing current from moving from said converter to said rectifier.

39. The system of claim 38, wherein said means for controlling comprises a booster circuit comprising an inductor, a converter switch and an inverse parallel diode.

40. The system of claim 39, further comprising means for using the booster current to charge a charge storage circuit of the converter.

41. The system of claim 39, further comprising means for drawing said output voltage from said charge storage circuit.

42. The system of claim 41, further comprising means for switching between applying a rectified voltage to the booster circuit synchronously with placing the second converter switch in a conducting state, and not applying said rectified voltage to said booster circuit when the booster current exceeds a predetermined value.

* * * * *